US009113196B2

(12) United States Patent
Sung et al.

(10) Patent No.: US 9,113,196 B2
(45) Date of Patent: Aug. 18, 2015

(54) METHOD AND DEVICE FOR PROCESSING A VIDEO SIGNAL USING INTER-VIEW PREDICTION

(75) Inventors: Jae Won Sung, Seoul (KR); Byeong Moon Jeon, Seoul (KR); Yong Joon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 901 days.

(21) Appl. No.: 13/128,555

(22) PCT Filed: Nov. 10, 2009

(86) PCT No.: PCT/KR2009/006579
§ 371 (c)(1),
(2), (4) Date: May 10, 2011

(87) PCT Pub. No.: WO2010/053332
PCT Pub. Date: May 14, 2010

(65) Prior Publication Data

US 2011/0222602 A1 Sep. 15, 2011

Related U.S. Application Data

(60) Provisional application No. 61/113,180, filed on Nov. 10, 2008, provisional application No. 61/113,177, filed on Nov. 10, 2008, provisional application No. 61/140,064, filed on Dec. 22, 2008, provisional application No. 61/152,266, filed on Feb. 13, 2009.

(51) Int. Cl.
*H04N 7/32* (2006.01)
*H04N 21/435* (2011.01)
(Continued)

(52) U.S. Cl.
CPC ....... *H04N 21/435* (2013.01); *H04N 19/00769* (2013.01); *H04N 19/103* (2014.11); *H04N 19/176* (2014.11); *H04N 19/597* (2014.11); *H04N 21/235* (2013.01)

(58) Field of Classification Search
None
See application file for complete search history.

(56) References Cited

U.S. PATENT DOCUMENTS

2007/0121722 A1* 5/2007 Martinian et al. ........ 375/240.12
2008/0219351 A1 9/2008 Kim et al.

(Continued)

FOREIGN PATENT DOCUMENTS

KR 10-20070098429 A 10/2007
KR 10-0789753 B1 1/2008

(Continued)

OTHER PUBLICATIONS

European Search Report dated Apr. 12, 2012 Application No. 09825015, 8 pages.

(Continued)

*Primary Examiner* — Joseph Ustaris
*Assistant Examiner* — William Adrovel
(74) *Attorney, Agent, or Firm* — Fish & Richardson P.C.

(57) ABSTRACT

A method and apparatus for processing a video signal using inter-viewpoint prediction are disclosed. The video signal processing method includes acquiring a type of a current block, acquiring a depth inter-view prediction flag according to the current block type, acquiring color information of a reference block corresponding to the current block when the current block is encoded using depth inter-view prediction according to the depth inter-view prediction flag, and predicting color information of the current block using the color information of the reference block. The video signal processing method performs inter-viewpoint prediction using depth information, such that a motion vector of a macroblock can be induced from a decoder using such depth information. Therefore, a motion vector of the macroblock is not separately coded. In addition, the video signal processing method uses a flag that indicates whether to perform inter-viewpoint prediction using depth information.

4 Claims, 9 Drawing Sheets

(51) Int. Cl.

| | |
|---|---|
| ***H04N 19/597*** | (2014.01) |
| ***H04N 21/235*** | (2011.01) |
| ***H04N 19/176*** | (2014.01) |
| ***H04N 19/103*** | (2014.01) |

(56) References Cited

U.S. PATENT DOCUMENTS

| | | | | |
|---|---|---|---|---|
| 2010/0074334 | A1 | 3/2010 | Jeon et al. | |
| 2011/0044550 | A1 * | 2/2011 | Tian et al. | 382/238 |

FOREIGN PATENT DOCUMENTS

| | | | |
|---|---|---|---|
| WO | WO 2006/041261 | A1 | 4/2006 |
| WO | WO 2009/131688 | | 10/2009 |

OTHER PUBLICATIONS

Zhu G et al: "MVA inter-view skip mode using depth information", 26. JVT Meeting; 83. MPEG Meeting; Jan. 1, 2008-Jan. 18, 2008; Antalya, (Joint Video Team of ISO/IEC JTC1/SC291WG11 and ITU-T SG.16), No. JVTZ029, Jan. 15, 2008, XP030007318, ISSN:0000-0136 * p. 1-p. 3*.

Gang Zhu et al: "Inter-View Skip Mode for FTV using Depth Information", 83. MPEG Meeting; Jan. 1, 2008-Jan. 18, 2008; Antalya; (Motion Picture Expert Group or ISO/IEC JTC1/SC29/WG11), No. M15098, Jan. 9, 2008, XP030043695, *p. 1-p. 3*.

Naito S et al: "CE6: Results on MVC", 23. JVT Meeting; 80. MPEG Meeting; Apr. 21, 2007-Apr. 27, 2007; San Josa CR, US; (Joint Video Team of ISO/IEC JTC1/SC29/WG11 and ITU-T SG. 16), No. JVT-WO96, Apr. 23, 2007, XP030007056, ISSN:0000-0153 * p. 1-p. 2*.

European Office Action dated Oct. 29, 2013 for Application No. 09825015, 6 pages.

Masayuki Tanimoto et al:"Depth Estimation using Stereo Camera Rectification for Non=parallel Camera Setup", 84. mpeg meeting; Apr. 28, 2008-May 2, 2008; Archamps;(Motion Picture Expert Group or ISO/IEC JTC1/SC29/WG11),. No. M15380, Apr. 25, 2008, xp030043977.

International Search Report dated Jun. 14, 2010 for Application No. PCT/KR2009/006579, with English translation, 4 pages.

* cited by examiner

FIG. 5

```
slice_data(?) {
    if( entropy_coding_mode_flag )
    while( !byte_aligned(?) )
        cabac_alignment_one_bit
    CurrMbAddr = first_mb_in_slice * ( 1 + MbaffFrameFlag )
    moreDataFlag = 1
    prevMbSkipped = 0
    do {
S100    if( slice_type != I && slice_type != SI )
            if( !entropy_coding_mode_flag ) {
                mb_skip_run
                prevMbSkipped = ( mb_skip_run > 0 )
                for( i=0; i<mb_skip_run; i++ )
                    CurrMbAddr = NextMbAddress( CurrMbAddr )
                moreDataFlag = more_rbsp_data(?)
        } else {
S110        mb_skip_flag
S120        moreDataFlag = !mb_skip_flag
        }
        if( !moreDataFlag ) {
S130        depth_skip_flag
        }
        if( moreDataFlag ) {
            if( MbaffFrameFlag && ( CurrMbAddr % 2 == 0 ||
                ( CurrMbAddr % 2 == 1 && prevMbSkipped ) ) )
                mb_field_decoding_flag
            macroblock_layer(?)
    }
  ...
```

METHOD AND DEVICE FOR PROCESSING A VIDEO SIGNAL USING INTER-VIEW PREDICTION

BACKGROUND OF THE INVENTION

1. Field of the Invention

The present invention relates to video signal coding.

2. Discussion of the Related Art

Compression coding involves a series of signal processing technologies used to transmit digitized information through a communication line or to store the digitized information in a specific form suitable for a storage medium. A variety of objects can be compression-coded, for example, sound data, image (or video) data, text data, etc. Particularly, technology for compression encoding image data is called image compression technology. Video data is characterized in that it has spatial redundancy and temporal redundancy.

SUMMARY OF THE INVENTION

Accordingly, the present invention is directed to a method and apparatus for processing a video signal using inter-viewpoint prediction that substantially obviate one or more problem due to limitations and disadvantages of the related art.

An object of the present invention is to provide a method and apparatus for increasing coding efficiency of a video signal.

Another object of the present invention is to provide a video signal processing method used when inter-viewpoint prediction (also called inter-view prediction) is performed on a macroblock, such that it obtains a position difference between viewpoints in units of either the macroblock or a pixel using depth information of the macroblock, and obtains a corresponding block referred by the macroblock using the position difference between viewpoints.

Another object of the present invention is to provide a video signal processing method that uses a flag to obtain a corresponding block referred by a macroblock, the flag indicating whether or not inter-viewpoint prediction is performed using depth information.

Another object of the present invention is to provide a video signal processing method that configures a motion vector candidate of a macroblock using depth information, and uses the most appropriate motion vector from among motion vector candidates as a motion vector of a current macroblock.

Another object of the present invention is to provide a video signal processing method for coding a macroblock as a skip mode using depth information.

Another object of the present invention is to provide a video signal processing method using a flag indicating whether or not a macroblock is coded as a skip mode using depth information.

A further object of the present invention is to provide a video signal processing method used when a macroblock is coded as a skip mode using depth information, such that it obtains a local motion vector in units of a macroblock or a macroblock partition.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing a video signal includes acquiring a type of a current block; acquiring a depth inter-view prediction flag according to the current block type, acquiring color information of a reference block corresponding to the current block, if the current lock is encoded using depth inter-view prediction according to the depth inter-view prediction flag, and predicting color information of the current block using the color information of the reference block, wherein the reference block is present at a viewpoint different from that of the current block.

The depth inter-view prediction flag may be a flag indicating whether the current block is to be encoded using either inter-view prediction or depth inter-view prediction, and the depth inter-view prediction may indicate that color information of the current block is predicted from a current block, a reference block corresponding to a pixel of the current block, or a pixel of the reference block using a corresponding depth block.

The acquisition of the depth inter-view prediction flag may include acquiring the depth inter-view prediction flag associated with a partition of the current block specified by the current block type.

The acquisition of the color information of the reference block may include inducing an inter-view position difference from the corresponding depth block, and inducing a pixel position of the reference block on the basis of the inter-view position difference and a pixel position of the current block, wherein color information of the reference block is acquired using color information of a pixel of the reference block dependent upon the pixel position of the reference block.

The acquisition of the color information of the reference block may include inducing an inter-view position difference from the corresponding depth block, inducing a representative inter-view position difference using the inter-view position difference, and inducing a position of the reference block on the basis of the representative inter-view position difference and the position of the current block, wherein color information of the reference block dependent upon the position of the reference block is acquired.

The inter-view position difference may be induced in units of a pixel of the corresponding depth block.

The corresponding depth block may be a block of a current depth picture located at the same position as the current block.

The inter-view position difference may be indicative of a disparity between the pixel position of the current block and the pixel position of the reference block corresponding to the current block pixel.

The representative inter-view position difference may be indicative of an average of the inter-view position differences.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 shows one example of a syntax that decides a skip mode method of a current block using a depth skip mode indication flag at a slice level according to an embodiment of the present invention.

DESCRIPTION OF SPECIFIC EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
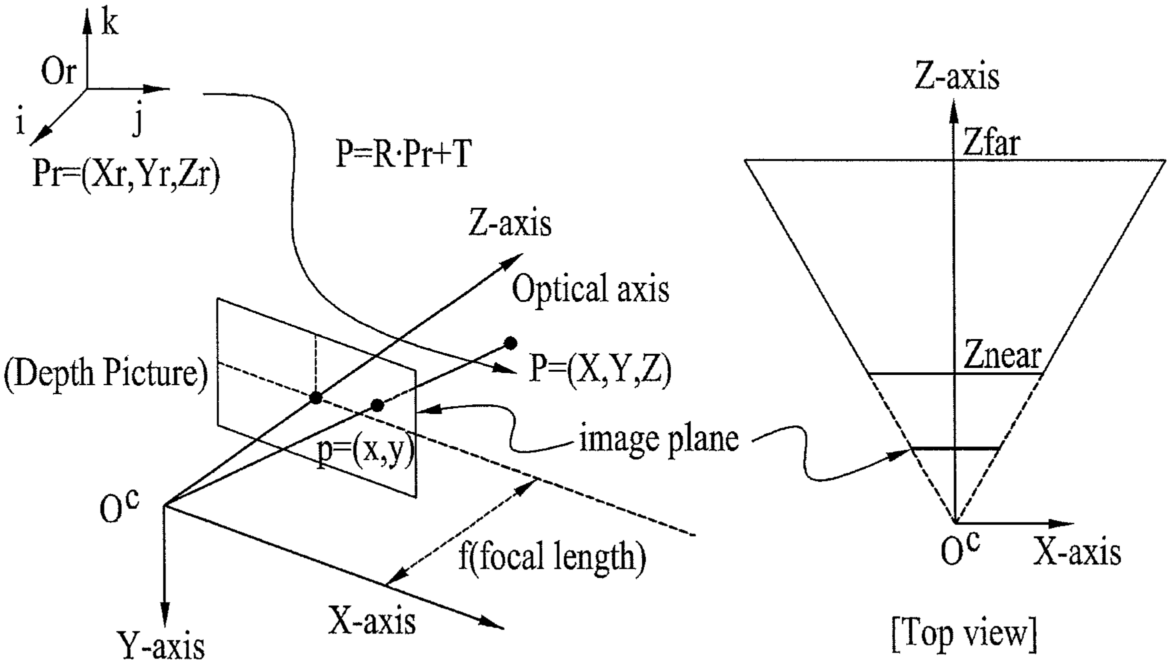
FIG. 1 is a conceptual diagram illustrating depth according to an embodiment of the present invention.

Compression coding technology for video signal or data considers spatial redundancy, temporal redundancy, scalable redundancy, and inter-viewpoint redundancy. When coding a depth picture so as to implement a 3D display based on a multi-viewpoint image, the present invention can compression code the video signal or data in consideration of spatial redundancy, temporal redundancy, etc. The compression coding technology may be applied to an image sequence composed of depth pictures, an image sequence composed of color pictures, and an image sequence composed of color pictures and depth pictures. In this case, the term ‘depth’ may be a difference in disparity caused by a difference in viewpoint, and a detailed description of the depth is shown in FIG. 1. In the following embodiments of the present invention, depth information, depth data, depth picture, depth sequence, depth coding, depth bitstream, etc. may be interpreted as depth-associated information according to how depth is defined. In addition, the term ‘coding’ may include both encoding and decoding, and may be flexibly interpreted according to the technical scope and range of the present invention.

A bitstream of a video signal is defined as a separated hierarchical layer structure that is called a Network Abstraction Layer (NAL) located between a Video Coding Layer (VCL) for handling motion image coding processing and a lower system for transmitting and storing coded information. The coding process outputs VCL data as an output signal, and is mapped in units of an NAL prior to transmission or storage of data. Each NAL unit includes a Raw Byte Sequence Payload (RBSP) corresponding to either compressed video data or header information. The RBSP means moving image compression result data.

The NAL unit is basically composed of an NAL header and an RBSP. The NAL header includes not only flag information (nal_ref_idc) indicating whether a slice serving as an NAL-based reference picture is included, but also ID information (nal_unit_type) indicating the type of NAL unit. RBSP stores compressed original data, and an RBSP trailing bit is added to the end of the RBSP such that the RBSP length is a multiple of 8 bits. There are a variety of types of such an NAL unit, for example, an Instantaneous Decoding Refresh (IDR) picture, a Sequence Parameter Set (SPS), a Picture Parameter Set (PPS), Supplemental Enhancement Information (SEI), etc.

In addition, current standards restrict a target or objective product to several profiles and levels in such a manner that the product can be implemented at appropriate cost. It is necessary for a decoder to satisfy predetermined restrictions at a corresponding profile and level. In order to represent functions and parameters of the decoder, two concepts (i.e., profile and level) are defined so that the range of a certain compressed image capable of being handled by the decoder can be recognized. Information about which profile incurs a basis of a bitstream can be identified by a profile ID (profile_idc). The profile ID means a flag indicating a profile on which a bitstream is based. For example, in the case of H.264/AVC, a profile ID of 66 means that a bitstream is based on a base line profile, a profile ID of 77 means that a bitstream is based on a main profile, and a profile ID of 88 means that a bitstream is based on an extended profile. The profile ID may be contained in a Sequence Parameter Set (SPS).

Accordingly, in order to deal with an image sequence (hereinafter referred to as a depth sequence) including one or more depth pictures, one embodiment of the present invention needs to identify whether an input bitstream relates to a profile of a depth sequence. If the input bitstream is identified as the profile of the depth sequence, one embodiment of the present invention needs to add a syntax in such a manner that at least one piece of additional information related to depth coding can be transmitted. In this case, the profile of the depth sequence indicates an additional H.264/AVC technology, may indicate a profile mode for dealing with the depth picture or may also indicate a profile mode related to multi-viewpoint video (also called multiview video) including a depth picture. Since depth coding is an add-on to conventional AVC technology, a technology for adding a syntax used as additional information for a depth coding mode may be more efficient than unconditional syntax addition. For example, provided that information regarding the depth coding is added when the AVC profile identifier (ID) indicates a profile of a depth sequence, coding efficiency can be increased.

The sequence parameter set (SPS) means header information including information related to the coding of the entire sequence. For example, a profile, a level, etc. may be contained in the header information. The entire compressed moving image, i.e., a sequence, must inevitably start from a sequence header, so that the sequence parameter set (SPS) corresponding to header information must arrive at a decoder at an earlier time than data referring to the parameter set. In conclusion, RBSP of the sequence parameter set is used as header information for the compressed moving image data. If a bitstream is received, a profile ID identifies which profile is related to an input bitstream. Accordingly, a specific part (for example, “If (profile_idc==DEPTH_PROFILE)”) indicating whether an input bitstream relates to a profile of the depth sequence is added to a syntax, such that it can be identified whether the input bitstream relates to the profile of the depth sequence, and a variety of attribute information can be added to the syntax only when the input bitstream relates to the depth sequence profile only. For example, a total number of viewpoints of the depth sequence, the number of depth-view reference pictures, and viewpoint ID numbers of the depth-view reference pictures may be added to the syntax. In addition, the decoded picture buffer may use information regarding the depth-view reference picture so as to generate and manage the list of reference pictures FIG. 1 is a conceptual diagram illustrating depth according to an embodiment of the present invention.

Referring to FIG. 1, the term "depth" may indicate a difference in disparity between image sequences captured by a plurality of cameras, the difference in disparity being caused by a difference in viewpoint between such image sequences. Referring to FIG. 1, the camera position ($0_s$) is the origin of a 3D camera coordinate system, and a Z-axis (optical axis) is arranged in a straight line with the viewing direction of the user's eyes. One arbitrary point P=(X,Y,Z) of the camera coordinate system may be projected on one point p=(x,y) of a 2D image plane perpendicular to the Z-axis.

In this case, the point 'p=(x,y)' on a 2D image plane may be represented by a color value of the point 'P=(X,Y,Z)' of a 3D coordinate system. In this case, the 2D image plane may denote a color picture. In addition, the point 'p=(x,y)' on the 2D image plane may be represented by a Z value of the point 'P=(X,Y,Z)' of the 3D coordinate system. In this case, the 2D image plane may represent a depth picture. In this case, the focal length (f) may represent the distance between the camera position and the image plane.

In addition, the point 'P=(X,Y,Z)' of the 3D coordinate system may represent one arbitrary point of the camera coordinate system. However, if the point 'P=(X,Y,Z)' is captured by a plurality of cameras, a common reference coordinate system for the plurality of cameras may be needed. In FIG. 1, an arbitrary point for use in a reference coordinate system that uses a point 0*w* as a reference may be represented by Pw=(Xw,Yw,Zw). Pw=(Xw,Yw,Zw) may be converted into one arbitrary point 'P=(X,Y,Z)' of the camera coordinate system using a 3×3 rotation matrix (R) and a 3×1 translation vector (T). For example, P may be represented by Equation 1.

$$P=R\times Pw+T \qquad \text{[Equation 1]}$$

When re-defining a depth picture or a depth map on the basis of the above-mentioned description, the depth picture or the depth map may be a set (or aggregate) of distance information obtained when a distance from a camera to an actual object (target) is numerically represented as a relative value on the basis of the camera position. The depth picture or the depth map may also be denoted by a picture unit, a slice unit, etc. In the depth picture or the depth map, depth information may be represented in units of a pixel.

Depth information of the depth picture may be obtained from a Z value of a 3D coordinate 'P=(X,Y,Z)' of the camera coordinate system corresponding to a pixel of a color picture. The Z value may be contained in the range of a real number, and is quantized to any real number such that the quantized Z value may be used as depth information of the depth picture. For example, the depth information of the depth picture may be represented by the following equation 2 or 3.

$$Zq=\mathrm{round}(255\times(Z-Znear)/(Zfar-Znear)) \qquad \text{[Equation 2]}$$

$$Zq=\mathrm{round}(255\times(1/Z-1/Zfar)/(1/Znear-1/Zfar)) \qquad \text{[Equation 3]}$$

In Equation 2 or 3, 'Zq' may be quantized depth information. Referring to the top view of FIG. 1, 'Znear' is the lower limit of a Z-axis value, and 'Zfar' is the upper limit of a Z-axis value. In Equation 2 or 3, the quantized depth information may have an integer of 0 to 255.

As described above, the depth picture or the depth map may be encoded with an image sequence of the color picture or be encoded differently from the image sequence of the color picture. In this case, a variety of embodiments of the present invention may be used to achieve compatibility with a conventional codec. For example, depth coding technology may be used to achieve compatibility with the H.264 codec, may be used as an extended technology within H.264/AVC multiview video coding, or may be used as an extended technology within scalable video coding. In addition, the depth coding technology may also be used as a separate codec technology that is capable of coding only the image sequence including a depth picture. Detailed embodiments of such depth coding according to the present invention will be given below, and may be utilized in various ways as described above.

Figure 2:
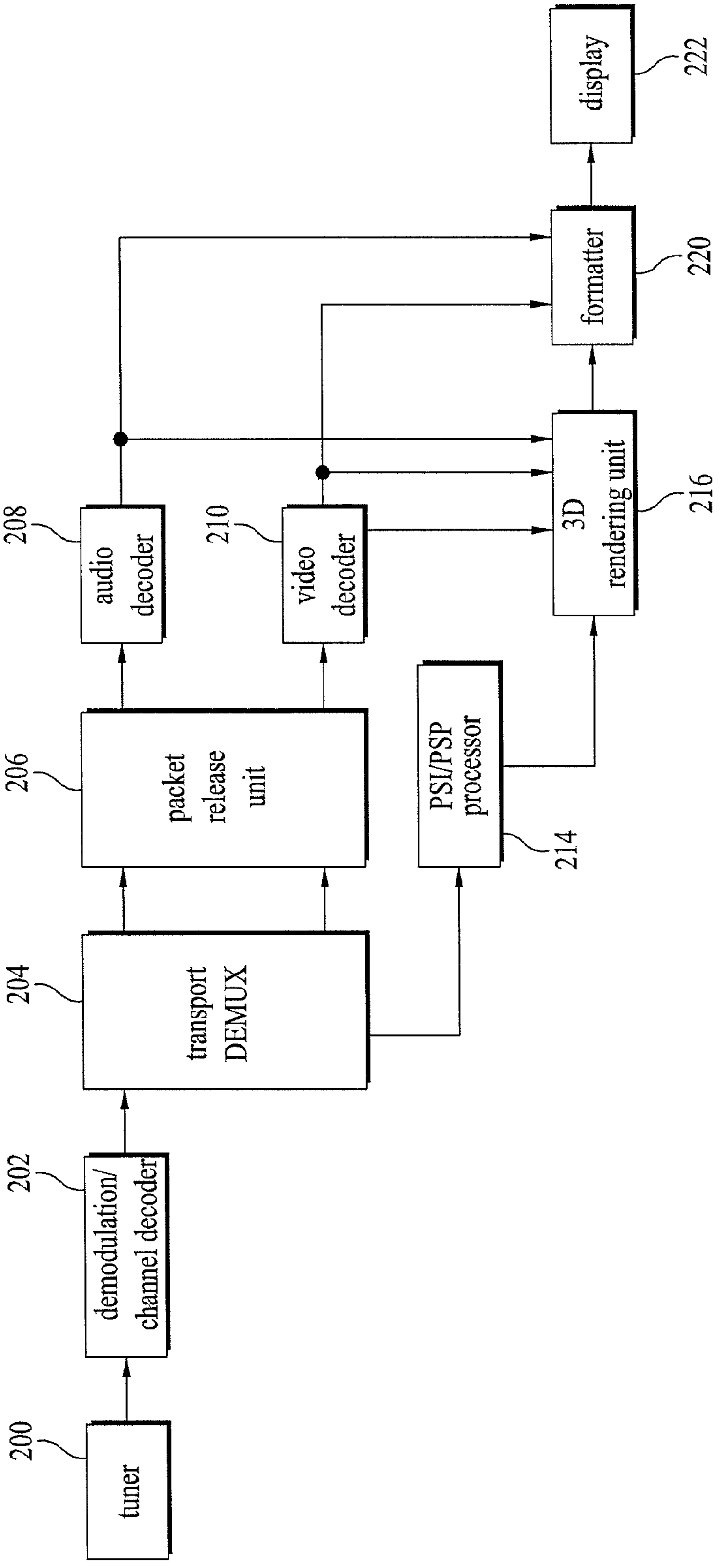
FIG. 2 is a block diagram illustrating a broadcast receiver to which depth coding is applied according to an embodiment of the present invention.

FIG. 2 is a block diagram illustrating a broadcast receiver to which depth coding is applied according to an embodiment of the present invention.

Referring to FIG. 2, the broadcast receiver according to the present invention is used to reproduce an image by receiving over-the-air broadcast signals. The broadcast receiver may reproduce 3D content using the received depth-associated information. The broadcast receiver includes a tuner 200, a demodulation/channel decoder 202, a transport demultiplexer (DEMUX) 204, a packet release unit 206, an audio decoder 208, a video decoder 210, a PSI/PSIP processor 214, a 3D rendering unit 216, a formatter 220, and a display 222.

The tuner 200 selects a broadcast signal of a user-selected channel from among a plurality of broadcast signals received through an antenna (not shown), and outputs the selected broadcast signal. The demodulation/channel decoder 202 demodulates a broadcast signal received from the tuner 200, and performs error correction decoding upon the demodulated signal, so that it outputs a transport stream (TS). The transport DEMUX 204 demultiplexes a transport stream (TS) so as to separate a video PES and an audio PES from each other, and extracts PSI/PSIP information. The packet release unit 206 releases packets of a video PES and an audio PES so as to recover the video ES and an audio ES. The audio decoder 208 decodes an audio ES so as to output an audio bitstream. The audio bitstream is converted into an analog audio signal by a digital-to-analog converter (DAC) (not shown), is amplified by an amplifier (not shown), and is then output through a speaker (not shown). The video decoder 210 decodes a video ES so as to recover an original image. The decoding process of the audio decoder 208 or the video decoder 210 may be carried out on the basis of a packet ID (PID) confirmed by the PSI/PSIP processor 214. The video decoder 210 may extract depth information through the decoding process. In addition, additional information needed to generate a virtual camera viewpoint image is extracted, and is then provided to the 3D rendering unit 216. In more detail, camera information, or information (e.g., geometrical information such as an object outline, object transparency information, and color information) for estimating a region (also called a occlusion region) occluded by an object located at a front site is extracted from the decoding process, so that the extracted information can be provided to the 3D rendering unit 216. However, according to another embodiment of the present invention, the depth information and/or the additional information may be isolated by the transport DEMUX 204.

A PSI/PSIP processor 214 receives PSI/PSIP information from the transport DEMUX 204, parses the received PSI/

PSIP information, and stores the parsed result in a memory (not shown) or register, such that broadcast data is reproduced on the basis of the stored information. The 3D rendering unit 216 may generate color information and depth information at a virtual camera position using the recovered image, depth information, additional information and a camera parameter.

In addition, the 3D rendering unit 216 performs 3D warping using depth information for the recovered image, such that it can generate a virtual image at a virtual camera position. Although the 3D rendering unit 216 is configured to be separate from the video decoder 210, the scope or spirit of the present invention is not limited thereto, and the 3D rendering unit 216 may also be contained in the video decoder 210.

The formatter 220 formats the recovered image (i.e., an image actually captured by a camera) obtained from the decoding process and a virtual image generated by the 3D rendering unit 216 according to a display scheme for use in the corresponding receiver, and displays a 3D image on the display 222. In this case, depth information and a virtual image are synthesized at a virtual camera position by the 3D rendering unit 216. Image formatting by the formatter 220 may be selectively performed in response to a user command. That is, a viewer may prevent a synthesized image from being displayed by operating a remote controller (not shown), or may indicate a viewpoint at which image synthesis is to be performed.

As can be seen from the above description, although depth information may be used in the 3D rendering unit 216 so as to generate a 3D image, it should be noted that the depth information may also be used in the video decoder 210 as necessary. A variety of embodiments for enabling the video decoder 210 to use depth information will hereinafter be described.

Figure 3:
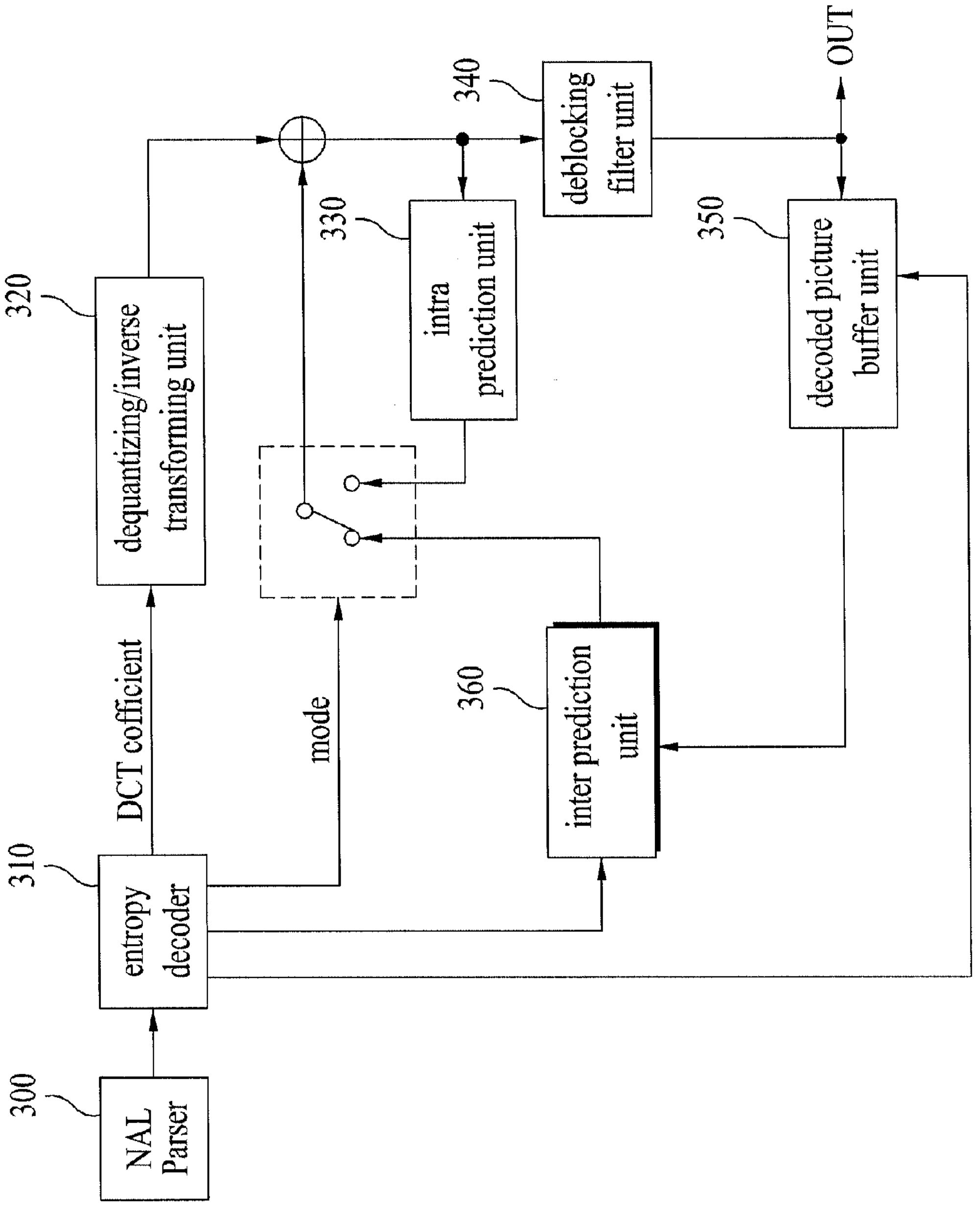
FIG. 3 is a block diagram illustrating an apparatus for decoding a video signal according to an embodiment of the present invention.

FIG. 3 is a block diagram illustrating an apparatus for decoding a video signal according to an embodiment of the present invention.

Referring to FIG. 3, the decoding apparatus may generally include a parsing unit 300 (NAL parser), an entropy decoder 310, a dequantizing/inverse transforming unit 320, an intra prediction unit 330, a deblocking filter unit 340, a decoded picture buffer unit 350, an inter prediction unit 360, etc. The decoded picture buffer unit 350 may generally include a reference picture a reference picture storage unit (not shown), a reference picture list generator (not shown), a reference picture manager (not shown), etc. The inter prediction unit 360 may include a motion skip discrimination unit 710, a corresponding block searching unit 720, a motion information induction unit 730, a motion compensation unit 740, and a motion information acquisition unit 750.

The parsing unit 300 parses data in units of an NAL so as to decode the received video image. Generally, one or more sequence parameter sets and one or more picture parameter sets are transmitted to a decoder before a slice header and slice data are decoded. In this case, the NAL header region or the extended region of the NAL header may include a variety of attribute information. For example, flag information capable of identifying whether there is an MVC bitstream may be added to the NAL header region or the extended region of the NAL header. Attribute information for a multi-viewpoint image may be added to the NAL header region or the extended region of the NAL header only when an input bitstream dependent upon the flag information is a multi-viewpoint image coded bitstream. For example, the attribute information may include view identification information, inter-view picture group identification information, inter-view prediction flag information, temporal level information, priority identification information, identification information indicating whether a picture is an instantaneous decoded picture associated with a viewpoint, etc., and as such a detailed description thereof will hereinafter be described with reference to FIG. 7.

The parsed bitstream is entropy-decoded by the entropy decoder 310, and a coefficient of each macroblock, a motion vector, etc. may be extracted. The dequantizing/inverse transforming unit 320 obtains a converted coefficient value by multiplying a predetermined constant by the received quantized value. The dequantizing/inverse transforming unit 320 inversely transforms the coefficient value so as to recover a pixel value. The intra prediction unit 340 performs intra-frame prediction from the decoded sample contained in a current picture using the recovered pixel value. On the other hand, the deblocking filter unit 340 may apply deblocking filtering to each coded macroblock so as to reduce block distortion. The filter softens a block edge so as to improve an image quality of a decoded frame. Selection of the filtering process may depend upon boundary strength and a gradient of image samples located in the vicinity of a boundary. Filtered depth pictures are stored in the decoded picture buffer unit 350 so that the filtered pictures can be output or used as reference pictures.

The decoded picture buffer unit 350 may store or open pre-coded depth pictures so as to perform inter-frame prediction. In this case, in order to store or open the pre-coded depth pictures in the decoded picture buffer unit 350, a frame number (frame_num) and Picture Order Count (POC) of each picture are used. Therefore, during the multi-view video coding (MVC), since depth pictures located at viewpoints different from a viewpoint of a current depth picture are present in the pre-encoded pictures, the frame number (frame_num), the POC, and viewpoint information identifying a viewpoint of the picture may be simultaneously utilized to use such pictures as reference pictures. The decoded picture buffer unit 350 may include a reference picture storage unit (not shown), a reference picture list generator (not shown), and a reference picture manager (not shown).

The reference picture storage unit may store pictures to be referred for current picture coding. The reference picture list generator may generate the list of reference pictures for intra-frame prediction. Since inter-viewpoint prediction may be achieved in multi-view video coding (MVC), it is necessary to generate a reference picture list for inter-viewpoint prediction when a current picture refers to a different-viewpoint picture.

The reference picture list generator may use information regarding a viewpoint so as to generate a reference picture list for inter-view prediction. For example, the reference picture list generator may use inter-view reference information. The inter-view reference information may denote information for indicating the relationship between viewpoints. For example, the inter-view reference information may include a total number of depth viewpoints, a view ID number, the number of inter-view reference pictures, and an ID number for identifying a viewpoint of the inter-view reference picture.

The reference picture manager manages a reference picture to more flexibly implement intra-frame prediction. For example, a memory management control operation method and a sliding window method may be used by the reference picture manager, such that a memory of a reference picture and a memory of a non-reference picture are managed as one memory and can be effectively managed using a small number of memories. In the multi-view video coding (MVC), viewpoint-directional pictures have the same POC (Picture Order Count) such that information for identifying a viewpoint of each picture may be used to perform marking of the view-directional pictures. Reference pictures managed through the above-mentioned process may be used in the inter prediction unit 360.

Through the above-mentioned processes, inter-frame predicted pictures and in-frame predicted pictures are selected according to a prediction mode so as to recover a current picture.

A block of a current color picture (hereinafter referred to as a current block) may predict color information of a current block through inter-view prediction. In other words, color information of a current block may be predicted from a block of a reference color picture (hereinafter referred to as a reference block) of a viewpoint contiguous to a current viewpoint, and the current viewpoint may denote a viewpoint to which the current color picture pertains. The viewpoint may denote a sequence composed of the same-viewpoint pictures, information of the viewpoint is specific information for identifying a viewpoint to which the NAL unit pertains, and it is considered that the NAL units having the same viewpoint information belong to the same viewpoint. The scope or spirit of the present invention is not limited to a current block, and a block of the current depth picture may predict depth information of a block of a current depth picture using the inter-view prediction.

The current block may predict color information of a current block from a reference block through depth inter-view prediction. The depth inter-view prediction may predict color information of the current block from a reference block (or a pixel of the reference block) corresponding to a current block (or a pixel of the current block) using a depth picture block (hereinafter referred to as a corresponding depth block) located at the same position as the current block. First, information regarding a current block type may be obtained from a macroblock layer. If the current block type is a P or B slice, the current block may be encoded using inter-view prediction or depth inter-view prediction. In this case, a flag that indicates whether a current block is to be encoded using the depth inter-view prediction can be defined. Hereinafter, the term ‘flag’ may be referred to as a depth inter-view prediction flag. The depth inter-view prediction flag is obtained, and information about whether the current block is coded using inter-view prediction or using depth inter-view prediction according to the depth inter-view prediction flag can be decided. For example, when acquiring the depth inter-view prediction flag, if the depth inter-view prediction flag is set to 1, a current block is encoded using depth inter-view prediction. If the depth inter-view prediction flag is set to 0, the current block is encoded using inter-view prediction. Alternatively, a new macroblock type is defined, such that it may indicate whether a current block is encoded using the depth inter-view prediction.

Next, if the current block is encoded using depth inter-view prediction according to the depth inter-view prediction flag, a detailed depth inter-view prediction process is as follows.

The pixel position of a reference block corresponding to a pixel of a current block is derived, so that color information of a pixel of the reference block may be obtained, a prediction block for the current block may be configured using color information of the reference block pixel, and the motion of the current block may be compensated using the prediction block.

Figure 4:
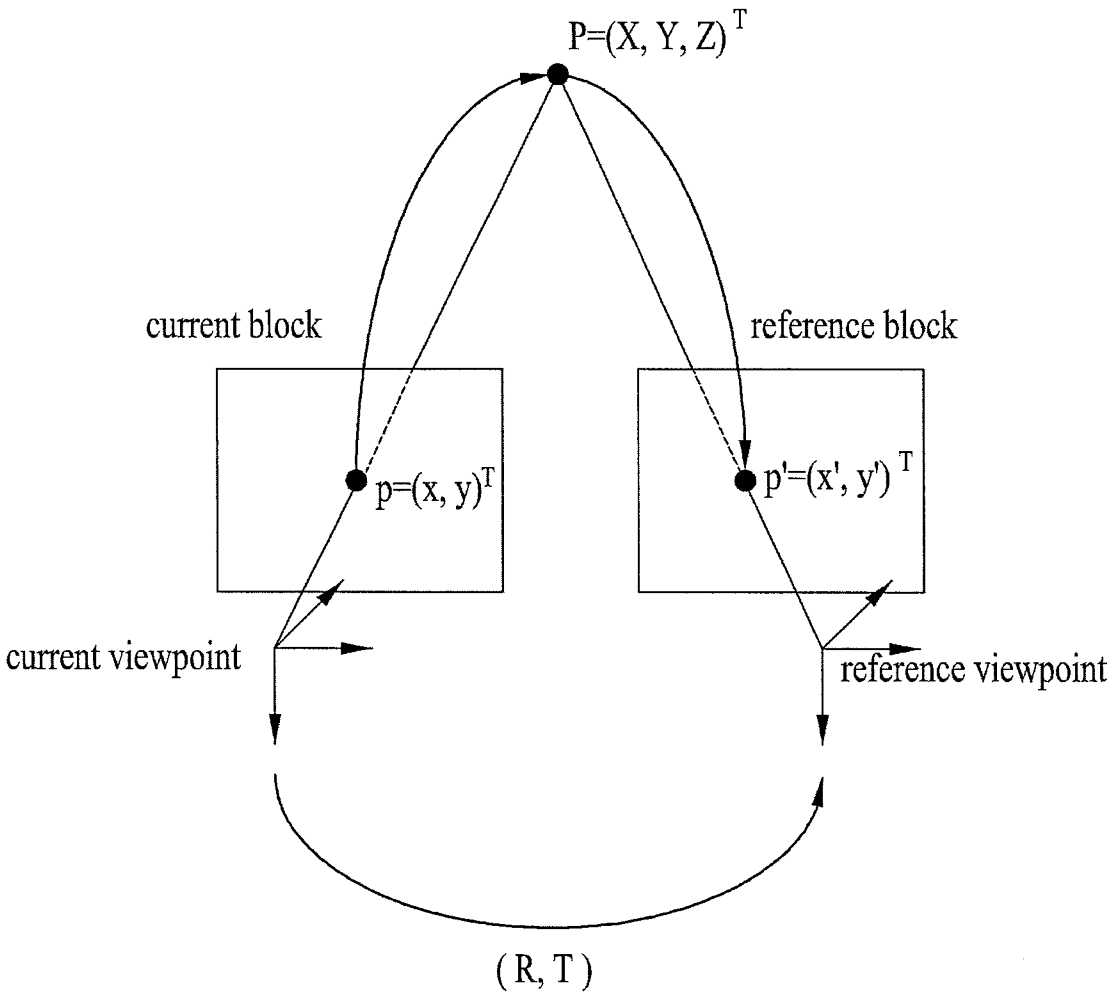
FIG. 4 is a conceptual diagram illustrating a method for deriving a pixel position of a reference block corresponding to a pixel of a current block according to an embodiment of the present invention.

FIG. 4 is a conceptual diagram illustrating a method for deriving a pixel position of a reference block corresponding to a pixel of a current block according to an embodiment of the present invention.

Referring to FIG. 4, a current-viewpoint spatial position can be obtained using both a pixel position of the current block and depth information of the corresponding depth block. The current-viewpoint spatial position may represent a 3D position to which a pixel of the current block of the current viewpoint is mapped on the basis of the current viewpoint. For example, if a 2D coordinate of the current block is denoted by ‘p=(x,y)’ and depth information of the depth block corresponding to ‘p=(x,y)’ is denoted by Z(p), a 3D coordinate ‘P’ on the camera coordinate system can be obtained. The 3D coordinate P can be obtained as shown in Equation 4.

$$P=Z\times K^{-1}\times\bar{p} \qquad \text{[Equation 4]}$$

In Equation 4, K is a (3×3) internal parameter of a current viewpoint camera, and $\bar{p}$ is a homogenous coordinate of the 3D coordinate (p).

The current viewpoint spatial position is position information of one object on the basis of the current viewpoint, such that it is necessary for the current viewpoint spatial position to be converted into a 3D position (hereinafter referred to as a ‘reference viewpoint spatial position’) on the basis of a reference viewpoint. For example, assuming that the reference viewpoint spatial position is denoted by P', P' may be calculated by the following equation 5 using a (3×3) rotation matrix (R) and a (3×1) translation vector (T).

$$P'(X',Y',Z')=R\times P+T \qquad \text{[Equation 5]}$$

In addition, a specific position where the reference viewpoint spatial position is projected on the reference block is obtained. For convenience of description, the specific position is called a ‘pixel position corresponding to the reference block’. For example, assuming that the pixel position corresponding to the reference block is denoted by p'=(x',y'), p' may be induced from the P' value and an internal parameter K' of the reference viewpoint camera as shown in the following equation 6.

$$Z'\times\bar{p}'=K'\times P' \qquad \text{[Equation 6]}$$

Therefore, color information of a reference block may be obtained on the basis of the above-mentioned position.

A method for deriving a pixel position of a reference block corresponding to a pixel of a current block according to another embodiment of the present invention will hereinafter be described.

For convenience of description and better understanding of the present invention, if multiple viewpoints are present, it is assumed that the multiple viewpoints are arranged at the same X axis of the camera coordinate system and have Z axes parallel to one another. If the pixel position p=(x,y) of the current block is compared with the corresponding pixel position p'=(x',y) of the reference block, it can be recognized that different x values are assigned to p=(x,y) and p'=(x',y) whereas the same y value is assigned to p=(x,y) and p'=(x',y). Therefore, a difference (hereinafter referred to as ‘d’) between the x values may indicate a variation in pixel position between the current block and the reference block corresponding to the current block pixel. The variation may be referred to as an inter-view position difference. The corresponding pixel position of the reference block may be obtained from a pixel position of the current block using the inter-view position difference. For example, the inter-view position difference may be calculated by the following equation 7 using a focal length (f) of the current viewpoint camera and a distance (B) between the current viewpoint camera and the reference viewpoint camera.

$$d=(f\times B)/Z \qquad \text{[Equation 7]}$$

In Equation 7, d is an inter-view position difference, and Z is depth information of the corresponding depth block. If the quantized depth information is used as depth information of the corresponding depth block, Z can be represented by the following equation 8 using the quantized depth information.

$$Z=1/\{Zq/255\times(1/Znear-1/Zfar)\}$$ [Equation 8]

In Equation 8, Znear is the lower limit of a Z-axis value of the 3D coordinate (P) of the camera coordinate system, and Zfar is the upper limit of the Z-axis value. For example, a 2D coordinate (x', y) of the reference block corresponding to the 2D coordinate (x, y) of the current block may be obtained by adding the 'd' value indicating the inter-view position difference (d) to the 2D coordinate (x, y), as denoted by x'=x+d.

$$x'=x+d$$ [Equation 9]

However, the pixel position of the reference block may be set to a 2 coordinate (x', y) decided by the 'd' value indicating the inter-view position difference, and may be set to any pixel position close to the 2D coordinate (x', y). That is, if x' is an integer, the pixel position of the reference block may be set to 2D coordinates (x', y). If x' is a real number not the integer, a 2D coordinate obtained by rounding-off the x' value may be set to the pixel position of the reference block.

The reference block position corresponding to a current block may be derived using a representative inter-view position difference of the corresponding depth block, and motion compensation may be performed using the reference block as a prediction block for the current block.

An inter-view position difference may be induced from depth information of the corresponding depth block using Equation 7, and the representative inter-view position difference may be induced from the inter-view position difference. The representative inter-view position difference may be defined as an average of the inter-view position differences, or may be defined as an intermediate value between the inter-view position differences. In addition, the representative inter-view position difference may also be defined as a position difference between the highest-frequency viewpoints from among the inter-view position differences. The reference block position may be derived by a difference between the current block position and the representative inter-view position. For example, assuming that the representative inter-view position difference is denoted by (d'), the position of the left upper pixel of the current block is denoted by (x, y), and the position of the left upper pixel of the reference block corresponding to the current block is denoted by (x', y), x' may be represented by the following equation 10.

$$x'=x+d'$$ [Equation 10]

Only a differential vector between a motion vector of the current block and a predicted value of the current block motion vector is encoded such that the amount of bits to be encoded can be reduced. The inter prediction unit 360 may extract a motion vector of a block contiguous to a current block, and may obtain a motion vector predicted value of the current block from the contiguous block. The contiguous block may include pixels which are located at a left side, a right side, and a right upper side of the current block. For example, the motion vector predicted value of the current block may be obtained using an intermediate value of each of horizontal and vertical components of the motion vectors of the contiguous blocks. Alternatively, if the block located at a left side of the current block includes one or more prediction blocks that are coded in the inter-frame prediction mode, a motion vector prediction value of the current block can be obtained using the motion vector of the prediction block located at the highest end. If the block located at the upper end of the current block includes one or more prediction blocks that are coded in the inter-frame prediction mode, a motion vector prediction value of the current block can be obtained using the motion vector of the prediction block located at the leftmost position. If a block located at the upper end of the current block and a block located at the upper end of the current block from among blocks contiguous to the current block are located outside of a boundary of a picture or slice, the motion vector of the left block may be established as a motion vector predicted value of the current block. If only one block having the same reference picture number as the current block is contained in the contiguous blocks, the motion vector of the one block may be established as a motion vector predicted value of the current block.

The motion vector predicted value may be obtained on the basis of a partition of a macroblock specified by a macroblock block type. For example, assuming that the current macroblock partition dependent upon the current macroblock type is denoted by 8×16, if an index of the current macroblock partition is set to 0, the block located at the left of the current macroblock may be used for such prediction. If the index of the current block is set to 1, the block located at the right upper end of the current block may be used for such prediction. Assuming that the partition of the macroblock dependent upon the current macroblock type is denoted by 16×8, if the index of the macroblock partition is set to 0, the block located at the upper end of the current block may be used for such prediction. If the index of the macroblock partition is set to 1, the block located at the left of the current block may be used for such prediction.

The motion of the current block is compensated using the obtained motion vector predicted value and the differential vector extracted from the video signal. In addition, such motion compensation may be performed using one or more reference pictures. For example, if the size of the macroblock is 16×16, each of 7 block sizes (16×16, 16×8, 8×16, 8×8, 8×4, 4×8, and 4×4) for inter-frame prediction may be used as a macroblock partition or a sub-macroblock partition. The seven block sizes may be hierarchically represented as shown in a macroblock or sub-macroblock type. In more detail, the block size may be specified according to a macroblock type, and one of 16×16, 16×8, 8×16, and 8×8 may be selected as the block size. If the (8×8) block size is selected, one of 8×8, 8×4, 4×8, and 4×4 block sizes may be selected as the sub-macroblock type. The reference picture number and the differential vector may be encoded at every macroblock partition or every sub-macroblock partition.

In accordance with another embodiment for obtaining the position of a reference block corresponding to the current block, a method for using the representative inter-view position difference as a motion vector predicted value of the current block may be used. For example, only a differential vector between the motion vector of the current block and the representative inter-view position difference may be decoded. The decoder may obtain the differential vector for either the macroblock partition or the sub-macroblock partition. The representative inter-view position difference may be induced from depth information of the corresponding depth block, and the motion vector of the current block may be derived using the representative inter-view position difference and the differential vector. Motion compensation may be achieved using the reference block indicated by the motion vector of the current block.

When recovering the current macroblock, the skip macroblock may use a pixel value of a macroblock contained in the pre-coded reference picture without using the current macroblock information (i.e., a motion vector, a reference picture number, and residual data). When coding the skip macroblock block, motion compensation may be performed using the motion vector predicted value of the skip macroblock, and the motion vector predicted value may be induced from contiguous blocks. If necessary, a method for inducing the motion vector predicted value from contiguous blocks may be identical to the above-mentioned method for inducing the motion vector predicted value.

It is determined whether the macroblock contained in the slice is a skip macroblock at a slice layer. In this case, a flag (hereinafter referred to as a skip mode indication flag) indicating whether the macroblock has been encoded in a skip mode may be utilized. For example, if a current slice type is not an I or SI slice, the skip mode indication flag for the macroblock contained in a current slice may be obtained. If the skip mode indication flag is set to 1, the current macroblock may be set to a P or B skip macroblock according to a current slice type. If the skip mode indication flag is set to 0, this means that the current macroblock is not encoded in a skip mode.

The current block may be encoded in a skip mode using depth information of the corresponding depth block, and this skip mode may be called a depth skip mode for convenience of description. As described above, the pixel position of the reference picture corresponding to the current block pixel is induced such that color information of the reference picture pixel can be obtained. The reference block may be configured using color information of the reference picture pixel and motion compensation may be performed using the reference block. Alternatively, the position of the reference block corresponding to the current block may be induced using the representative inter-view position difference of the corresponding depth block, and motion compensation may be performed using the reference block.

A flag (hereinafter referred to a depth skip mode indication flag) indicating whether a current block is encoded in a skip mode or a depth skip mode may be defined, and the skip mode method of the current block may be decided according to the depth skip mode indication flag.

FIG. 5 shows one example of a syntax that decides a skip mode method of a current block using a depth skip mode indication flag at a slice level according to an embodiment of the present invention.

Referring to FIG. 5, if the slice type is not an I or SI slice, inter prediction, inter-view prediction or depth inter-view prediction may be possible (S100). Therefore, if the current slice type is not the I or SI slice, a skip mode indication flag for the current macroblock may be obtained (S110). If the skip mode indication flag is set to 1, the current macroblock may be determined to be a skip macroblock. Accordingly, one embodiment of the present invention may not acquire a macroblock type of the current macroblock, and may also not acquire motion information, residual data, etc. A flag (moredataFlag) indicating whether other information such as motion information is obtained from the current macroblock may be set to 0 (S120). If the flag (moredataFlag) is set to 0, the depth mode indication flag may be obtained from the current macroblock (S130). For example, if the depth skip mode indication flag is set to 1, the current macroblock may be encoded in a depth skip mode. If the depth skip mode indication flag is set to 0, the current macroblock may be encoded in a skip mode.

Figure 6:
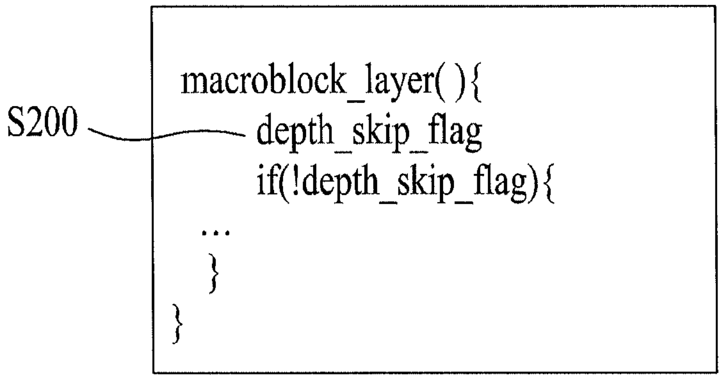
FIG. 6 shows one example of a syntax that decides a skip mode method of a current block using a depth skip mode indication flag at a macroblock level according to an embodiment of the present invention.

FIG. 6 shows one example of a syntax that decides a skip mode method of a current block using a depth skip mode indication flag at a macroblock level according to an embodiment of the present invention.

Referring to FIG. 6, when acquiring a skip mode indication flag for the current macroblock, if the current macroblock is not identical to the skip macroblock, the depth skip mode indication flag for the current macroblock may be obtained at the macroblock level (S200). The skip mode method of the current macroblock may be determined according to the depth skip mode indication flag. For example, if the depth skip mode indication flag is set to 1, the current macroblock may be encoded in a depth skip mode. If the depth skip mode indication flag is set to 0, the macroblock type for the current macroblock may be obtained, and intra prediction or inter prediction may be performed according to the macroblock block type.

Figure 7:
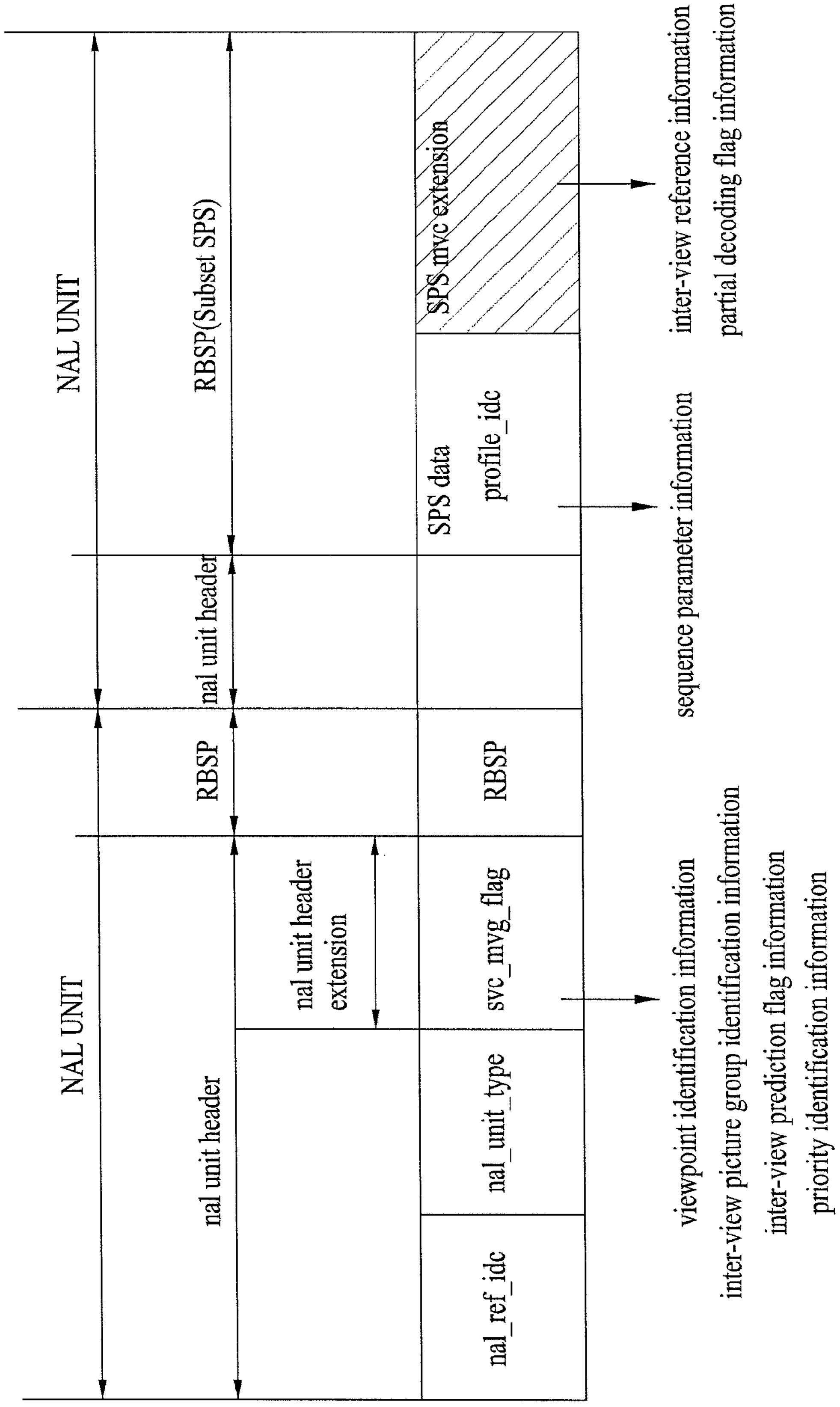
FIG. 7 shows multi-viewpoint image attribute information that is capable of being added to a multi-viewpoint image encoded bitstream according to an embodiment of the present invention.

FIG. 7 shows multi-viewpoint image attribute information that is capable of being added to a multi-viewpoint image encoded bitstream according to an embodiment of the present invention.

FIG. 7 shows one example of an NAL unit to which multi-viewpoint attribute information can be added. The NAL unit is basically composed of an NAL unit header and a Raw Byte Sequence Payload (RBSP). The NAL unit header includes not only ID information (nal_ref_idc) indicating whether the NAL unit includes a slice of the reference picture, but also information (nal_unit_type) indicating the type of NAL unit. In addition, an extended region of the NAL unit header may be further included as necessary. For example, if the information indicating the NAL unit type relates to multi-view video coding (MVC), or if the information regarding the NAL unit type indicates a prefix NAL unit, the NAL unit may include the extended region of the NAL unit header. In more detail, if information (nal_unit_type) is set to 20 or 14, the NAL unit may further include the extended region of the NAL unit header. In addition, the extended region of the NAL unit header may further include attribute information of a multi-view image according to flag information (svc_mvc_flag) capable of identifying whether a bitstream is an MVC bitstream.

In another example, if information indicating the NAL unit type indicates a sequence parameter set (SPS), the RBSP may include information regarding the SPS. In more detail, if information (nal_unit_type) is set to 7, the RBSP may include sequence parameter set (SPS) information. Alternatively, if information (nal_unit_type) is set to 15, the RBSP may include information regarding a subset sequence parameter set (subset SPS). In this case, the subset sequence parameter set (subset SPS) may include the extended region of the sequence parameter set (SPS) according to profile information. For example, if profile information (profile_idc) relates to multi-view video coding (MVC), the subset SPS may include the extended region of the SPS. The extended region of the SPS may include inter-view reference information indicating the relationship between viewpoints.

A variety of attribute information for a multi-view image will hereinafter be described in detail, for example, attribute information capable of being contained in an extended region of the NAL unit header, and attribute information capable of being contained in the extended region of the sequence parameter set (SPS).

First, viewpoint identification information (also called 'view identification information') is specific information for identifying a picture located at a viewpoint different from that of a current viewpoint picture. In order to identify each picture when a video image signal is encoded, a Picture Order Count (POC) and a frame number (frame_num) may be utilized. In case of using a multi-view video image, inter-view prediction is performed so that identification information for identifying a picture located at a viewpoint different from that of the current viewpoint picture is needed. Therefore, it is necessary to define viewpoint identification information for identifying a viewpoint of a picture. The viewpoint identification information may be obtained from a header region of a video signal. For example, the header region may be an NAL header region or an extended region of the NAL header. Information regarding a picture located at a viewpoint different from that of a current picture may be obtained using the viewpoint identification information, and the video signal may be decoded using information of the different-viewpoint picture.

The viewpoint identification information may be applied throughout the encoding/decoding process of the video signal. For example, the viewpoint identification information may be used to indicate the relationship between viewpoints. In order to represent the relationship between viewpoints, information regarding the number of inter-view reference pictures, and viewpoint identification information of the inter-view reference picture may be needed. In the same manner as in the information regarding the number of inter-view reference pictures and the viewpoint identification information of the inter-view reference picture, information used for indicating the relationship between viewpoints may be called inter-view reference information for convenience of description. In order to indicate viewpoint identification information of the inter-view reference picture, the viewpoint identification information may be utilized. The inter-view reference picture may denote a reference picture used to perform inter-view prediction of the current picture. In addition, instead of a specific viewpoint identifier, a frame number (frame_number) considering viewpoint information may be applied to multi-view video coding (MVC) without any change.

Inter-view picture group identification information may denote specific information for identifying whether a coded picture of a current NAL unit is an inter-view picture group. In addition, the inter-view picture group may denote an encoded picture that refers to only each slice that belongs to a frame of the same time zone. For example, the inter-view picture group may denote an encoded picture that refers to only a different viewpoint slice without referring to a current viewpoint slice.

Inter-view prediction flag information may denote specific information indicating whether the encoded picture of the current NAL unit is used for inter-view prediction. The inter-view prediction flag information may be used at a temporal prediction part or an inter-view prediction part. In this case, the inter-view prediction flag information may also be utilized along with identification information indicating whether the NAL unit includes a slice of the reference picture. For example, if the current NAL unit is used for inter-view prediction on the condition that it does not include a slice of the reference picture according to the identification information, the current NAL unit may be a reference picture used for inter-view prediction only. Alternatively, if the current NAL unit includes the reference picture slice according to the identification information and is used for inter-view prediction, the current NAL unit may be used for temporal prediction and inter-view prediction. In addition, although the NAL unit does not include the reference picture slice according to the identification information, the inter-view prediction flag information may be stored in the decoded picture buffer. Except for the case in which the flag information and the identification information are simultaneously used, the inter-view prediction flag information may indicate whether the encoded picture of the current NAL unit is used as one identification information to achieve temporal prediction and/or inter-view prediction.

In addition, the inter-view prediction flag information may also be utilized in a single loop decoding process. If the encoded picture of the current NAL unit is not used for inter-view prediction according to the inter-view prediction flag information, partial decoding may be performed. For example, an intra macroblock may be completely decoded, and only residual information of an inter macroblock may be decoded as necessary. When a user views only a specific-viewpoint image instead of all-viewpoint images and image recovery through motion compensation need not be performed in different viewpoints, the above-mentioned partial decoding may be effectively utilized.

Temporal level information may indicate information regarding a hierarchical structure to provide temporal scalability from a video signal. Through such temporal level information, images of a variety of time zones may be provided to the user.

Priority identification information may denote information for identifying priority of an NAL unit. The viewpoint scalability may be provided to the user using the priority identification information. For example, the viewpoint level information may be defined using the priority identification information. The viewpoint level information may denote information regarding a hierarchical structure to provide the viewpoint scalability from a video signal. It is necessary to define a temporal level and a viewpoint level in a multi-viewpoint video image so as to provide the user with a variety of temporal and viewpoint images. If such level information is defined as described above, the temporal and viewpoint scalability may be utilized. As a result, the user may view only a desired temporal- and viewpoint-image, or may also view only an image dependent upon a different restriction condition. The level information may be differently established in various ways according to a reference condition. For example, the level information may be differently established according to the camera position, or may also be differently established according to a camera arrangement format. In addition, the level information may be determined in consideration of inter-view reference information. For example, a level of 0 may be assigned to a viewpoint at which the inter-view picture group is an I picture. A level of 1 may be assigned to a viewpoint at which the inter-view picture group is a P picture. A level of 2 may be assigned to a viewpoint at which the inter-view picture group is a B picture. In this way, the above-mentioned level value may be assigned to the priority information. In addition, the level information may be optionally established without considering a special reference.

Since inter-view reference information of the inter-view picture group is different from that of the non-interview picture group, it is necessary to discriminate between the inter-view picture group and the non-interview picture group according to inter-view picture group identification information.

The inter-view reference information may denote how inter-view images are predicted as a certain structure. The inter-view reference information may be obtained from a data region of a video signal, for example, a sequence parameter set region. In addition, the inter-view reference information may be recognized using the number of reference pictures and viewpoint information of the reference picture. For example, information indicating a total number of viewpoints is first acquired, and viewpoint identification information for identifying each viewpoint on the basis of the total number of viewpoints may be recognized. In addition, information regarding the number of inter-view reference pictures indicating the number of reference pictures associated with a reference direction may be obtained at every viewpoint.

Viewpoint identification information of each inter-view reference picture may be obtained according to the number of inter-view reference pictures.

Through the above-mentioned scheme, the inter-view reference information may be acquired, and a method for acquiring the inter-view reference information may be divided into two cases (i.e., one of the inter-view picture group and the other case of the non-interview picture group, such that the inter-view reference information can be differently acquired according to the two cases. The above-mentioned information may be recognized using inter-view picture group identification information indicating whether an encoded slice contained in the current NAL is an inter-view picture group.

In multi-view video coding (MVC), inter-viewpoint prediction may be possible. The inter-viewpoint prediction may be performed in the same manner as in the intra-frame prediction for use in the H.264/AVC.

Therefore, the motion vector predicted value of the current block may be obtained from a motion vector of a contiguous block of the current block as described above. In addition, the motion vector of a block located at the same position as the current block may also be used as the motion vector predicted value of the current block. In this case, the block located at the same position as the current block may belong to a reference picture having the same viewpoint information as the current block.

Furthermore, since inter-view prediction and depth inter-view prediction are possible in the multi-view video coding (MVC), a local motion vector may be induced from depth information of the corresponding depth block, and the local motion vector may be used as a motion vector predicted value of the current block. A detailed description of the local motion vector will be given in the motion skip part to be described later.

In addition, the motion vector of a different-viewpoint reference block indicated by the local motion vector may also be used as the motion vector predicted value of the current block.

The encoder may encode the current block using the aforementioned motion vector predicted values, and may select a motion vector predicted value having an optimum distortion rate. The decoder may acquire information indicating which motion vector predicted value is used for the current block encoding from a sequence parameter set, a picture parameter set, or a slice level, such that the optimum motion vector predicted value may be hierarchically utilized. In addition, since the above-mentioned information is also obtained from the macroblock level, a method for acquiring the motion vector predicted value from the macroblock may be decided. For example, if the number of available motion vector predicted values from among the motion vector predicted values at each of the sequence parameter set, the picture parameter set and the slice level is 2, a motion vector predicted value used for coding the current macroblock may be indicated using a flag at a macroblock level. In other words, the flag may indicate a scheme for acquiring a motion vector predicted value of the current macroblock.

In addition, the motion vector predicted value sued for coding the current macroblock may be established on the basis of the inter-view picture group identification information. If it is determined that the current picture is an inter-view picture group on the basis of the inter-view picture group identification information, this means that a local motion vector is used as a motion vector predicted value of the current macroblock. If the current picture is a non-interview picture group, the motion vector of the reference block indicated by the local motion vector may be used as a motion vector predicted value of the current macroblock.

Figure 8:
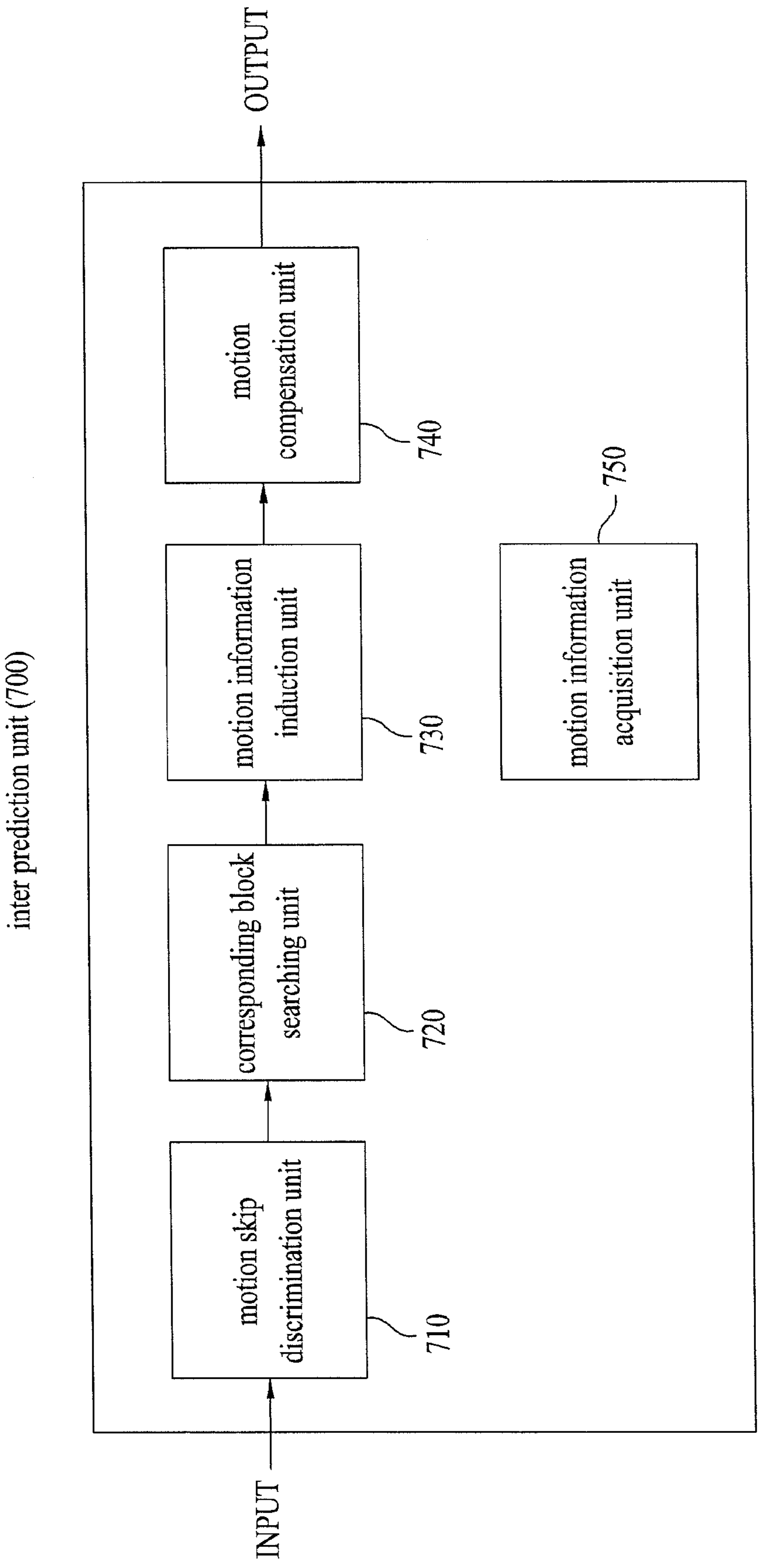
FIG. 8 is a conceptual diagram illustrating a method for performing motion compensation according to whether a motion skip is performed.

FIG. 8 is a conceptual diagram illustrating a method for performing motion compensation according to whether a motion skip is performed.

Referring to FIG. 8, the inter prediction unit 360 compensates for the motion of a current block using information transmitted from the entropy decoder 310. The motion vector of each contiguous block of the current block may be extracted from a video signal, and a motion vector predicted value of the current block may be acquired. A motion of the current block is compensated using a differential vector extracted from the acquired motion vector predicted value and the video signal. In addition, such motion compensation may be performed using one reference picture or a plurality of pictures. In multi-view video coding (MVC), if a current picture refers to different-viewpoint pictures, motion compensation may be performed using information of the list of inter-viewpoint prediction reference pictures used for stored in the decoded picture buffer unit 350. In addition, motion compensation may also be performed using viewpoint information identifying a viewpoint of the corresponding picture.

The motion skip discrimination unit 710 identifies whether motion information of the current block is to be induced. For example, flag information (hereinafter referred to as motion skip flag information) indicating whether or not motion skip is executed may be utilized. The motion skip flag information may be hierarchically established. For example, the motion skip flag information may be hierarchical established in at least one of a sequence level, a viewpoint level, a Group Of Picture (GOP) level, a picture level, a slice level or a macroblock level, and a sub-block level.

If the motion skip flag information is set to 1, motion skip is performed. That is, motion information of the current block may be induced from motion information of the reference block. On the other hand, if the motion skip flag information is set to 0, motion information that has been transmitted without performing such motion skip is obtained. In this case, the motion information may include a motion vector, a reference picture number, a block type, a partition information, etc.

For example, first flag information (motion_skip_enable_flag) may be acquired from the slice header. The first flag information may indicate whether the current slice uses the motion skip. For example, if the first flag information is set to 1, the current slice uses the motion skip. If the first flag information is set to 0, the current slice does not use the motion skip. If the first flag information is not present, the first flag information may be induced to zero.

In addition, second flag information (motion_skip_flag) may be acquired from a macroblock layer. The second flag information may be acquired on the basis of the first flag information. The second flag information may indicate whether the current block uses the motion skip. That is, the second flag information may indicate whether motion information of the current block is induced from motion information of a different-viewpoint reference block. For example, if motion skip is used in the current slice according to the first flag information, the second flag information for the current macroblock may be re-acquired from the macroblock layer. If the second flag information is set to 1, motion information of the current macroblock may be induced from a different-viewpoint reference block. If the second flag information is set to 0, motion information of the current macroblock is not induced from the different-viewpoint reference block. If the second flag information is not present, the second flag information may be induced to zero. In this way, the motion skip flag information may be hierarchically established in at least two levels such that it can hierarchically control whether to perform the motion skip. Alternatively, the motion skip flag information may be independently established in only one level.

The motion skip flag information may be acquired on the basis of the inter-view picture group identification information. The motion skip flag information may include the first flag information and/or the second flag information. If the current picture corresponds to the non-interview picture group according to the inter-view picture group identification information, the motion skip flag information can be acquired.

In addition, the motion skip flag information may be acquired on the basis of the inter-view reference information. For example, the motion skip flag information may be obtained only when the inter-view reference relationship is present. The inter-view reference relationship may indicate, for example, the inter-view reference relationship of the non-interview picture group. In more detail, the motion skip flag information may be acquired on the basis of the number of inter-view reference pictures of the non-interview picture group. If the number of inter-view reference pictures associated with the direction (L0) of the non-interview picture group is higher than 0, the motion skip flag information can be acquired. Otherwise, if the number of inter-view reference pictures associated with the other direction (L1) of the non-interview picture group is higher than 0, the motion skip flag information can be acquired.

The motion skip flag information may also be acquired on the basis of the inter-view picture group identification information and the inter-view reference information. For example, provided that the current picture is not identical to the inter-view picture group and the number of inter-view reference pictures for the L0 and/or L1 directions of the non-interview picture group is higher than 0, the motion skip flag information can be acquired.

In the case where the motion skip is performed by the motion skip discrimination unit 710, the corresponding block searching unit 720 searches for the corresponding block. The motion information induction unit 730 may induce motion information of the current block using the motion information of the corresponding block. The motion compensation unit 740 performs motion compensation using the induced motion information. On the other hand, if the motion skip is not performed by the motion skip discrimination unit 710, the motion information acquisition unit 750 acquires the transmitted motion information. The motion compensation unit 740 performs motion compensation using the acquired motion information. Detailed processes for performing such motion compensation will hereinafter be described.

A global motion vector may indicate a motion vector capable of being commonly applied to a predetermined region. For example, if the motion vector corresponds to some regions (e.g., macroblock, block, pixel, etc.), the global motion vector (or global disparity vector) may denote a motion vector corresponding to the overall region including the some regions. For example, the overall region may correspond to one slice, one picture, or the entire sequence. Such a global motion vector may be a value of a pixel unit or a value of a ¼ pixel unit, or may also be a value of a 4×4 unit, a 8×8 unit or a macroblock unit.

The global motion vector may be acquired on the basis of inter-view picture group identification information. For example, if the current picture corresponds to an inter-view picture group according to the inter-view picture group identification information, the global motion vector can be obtained. In this case, the global motion vector may include a global motion vector for the L0 and/or L1 directions.

In addition, the global motion vector may be acquired on the basis of a slice type. For example, if the slice type of the current macroblock is a P slice or a B slice, the global motion vector may be acquired. If the slice type of the current macroblock is a P slice, the global motion vector for the L0 direction may be obtained. If the slice type of the current macroblock is indicative of the B slice, the global motion vectors for the L0 and L1 directions can be obtained.

In addition, the global motion vector may be acquired on the basis of the inter-view reference information. For example, the global motion vector may be acquired on the basis of information regarding the number of inter-view reference pictures of the non-interview picture group. As many the L0-directional global motion vectors as the number of inter-view reference pictures associated with the L0 direction of the non-interview picture group may be acquired. Alternatively, as many the L1-directional global motion vectors as the number of inter-view reference pictures associated with the L1 direction of the non-interview picture group may be acquired. In this way, in order to acquire the global motion vector, the above-mentioned examples may be used as independent essentials or may also be used according to a combination thereof.

It is possible to search for the corresponding block referred by the current block using the global motion vector. In addition, coding information of the current block can be predicted using the above-mentioned corresponding block.

Figure 9:
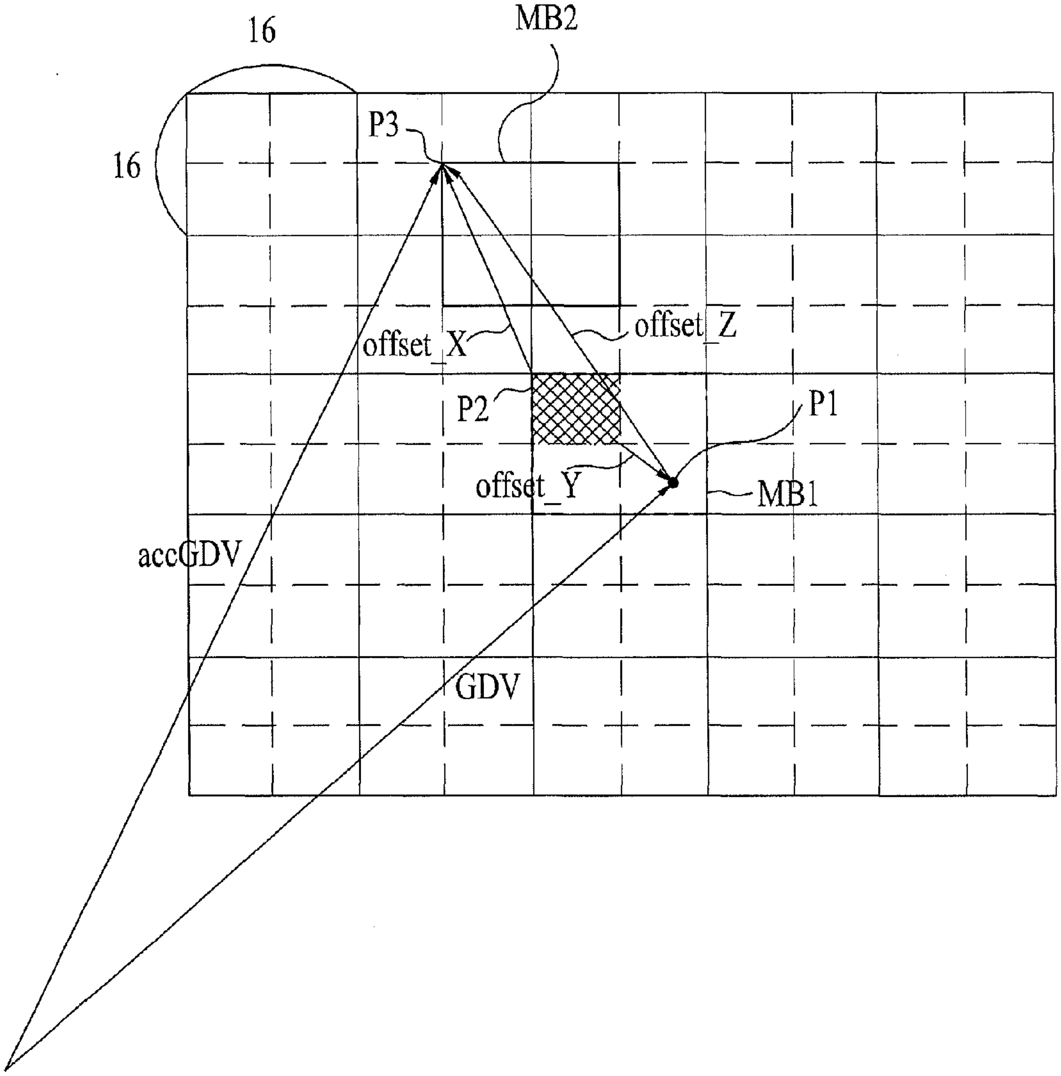
FIG. 9 is a conceptual diagram illustrating a method for searching for a corresponding block using additional information according to the present invention. 상세설명에는 있으나 도면란에는 없어 삽입함

FIG. 9 is a conceptual diagram illustrating a method for searching for a corresponding block using additional information according to the present invention.

The accuracy of the global motion vector may be deteriorated according to application regions. In this case, the accuracy of the motion vector can be increased using additional information. The additional information may include viewpoint direction information of the corresponding block and offset information. For example, the viewpoint direction information of the corresponding block may indicate whether the corresponding block is located in the L0 or L1 direction on the basis of the current block. The offset information may include first offset information (offset_X) that indicates a position difference between a corresponding block (MB1) indicated by a global motion vector of the current block and the actual reference block (MB2) including motion information. In this case, the corresponding block (MB1) or the reference block (MB2) may be a 16×16 macroblock. In addition, the first offset information (offset_X) may be acquired from a macroblock layer when the motion skip is performed. A method for inducing a motion vector indicating the reference block (MB2) using the first offset information (offset_X) will hereinafter be described with reference to FIG. 9.

First, it is possible to induce second offset information (offset_Y) indicating a difference between a position (P1) indicated by the global motion vector of the current block and a position (P2) of the macroblock (MB1) including the position (P1). In this case, the second offset information (offset_Y) may indicate a variable. For example, the second offset information (offset_Y) may be induced on the basis of the position (P1) indicated by the global motion vector of the current block. In more detail, provided that a remainder obtained when each of the horizontal and vertical component values of the P1 position (x,y) indicated by the global motion vector of the current block is divided by 2 is denoted by (0,0), the second offset information (offset_Y) is set to (0,0). In addition, if the remainder is (0,1), the second offset information (offset_Y) may be set to (0,1). If the remainder is (1,0), the second offset information (offset_Y) may be set to (1,0). If the remainder is (1,1), the second offset information (offset_Y) may be set to (1,1).

Third offset information (offset_Z) indicating a difference between the position (P1) indicated by the global motion vector of the current block and the position (P3) of the reference block (MB2) may be induced using the first offset information (offset_X) and the second offset information (offset_Y), as denoted by the following equation 4.

$$\text{offset\_}Z[0]=\text{offset\_}X[0]-\text{offset\_}Y[0]$$

$$\text{offset\_}Z[1]=\text{offset\_}X[1]-\text{offset\_}Y[1] \qquad \text{[Equation 4]}$$

In Equation 4, the value of 0 may denote the horizontal direction, and the value of 1 may denote the vertical direction.

A corrected motion vector may be induced using the global motion vector (GDV) and the induced third offset information (offset_Z). For example, the corrected motion vector may denote a motion vector (accGDV) indicating the reference block (MB2). In this case, when the encoder calculates distortion rates (rate-distortion) of all blocks, the reference block (MB2) may denote one block having an optimum distortion rate from among several blocks. The corrected motion vector may be induced as shown in the following equation 5.

$$acc\text{GDV}[0]=\text{GDV}[0]+\text{offset\_}Z[0]$$

$$acc\text{GDV}[1]=\text{GDV}[1]+\text{offset\_}Z[1] \qquad \text{[Equation 5]}$$

Position information of the reference block (MB2) may be induced using the corrected motion vector (accGDV). For example, assuming that the remainder obtained when each of the horizontal and vertical component values of the P3 position (x,y) indicated by the corrected motion vector is divided by 2 is denoted by (0,0), this means 'Mode 0'. In this case, 'Mode 0' may indicate that the position of the reference block (MB2) is identical to the position of a left upper 8×8 block from among 16×16 macroblocks divided into 4 equal 8×8 units. In addition, assuming that the remainder obtained when each of the horizontal and vertical component values of the P3 position (x,y) indicated by the corrected motion vector is divided by 2 is denoted by (1,0), this means 'Mode 1'. In this case, 'Mode 1' may indicate that the position of the reference block (MB2) is identical to the position of a right upper 8×8 block from among 16×16 macroblocks divided into 4 equal 8×8 units. In this way, assuming that the remainder is denoted by (0,1), this means 'Mode 2'. Assuming that the remainder is denoted by (1,1), this means 'Mode 3'. 'Mode 2' may indicate the position of a 8×8 block located at a left lower end, and 'Mode 3' may indicate the position of a 8×8 block located at a right lower end.

As described above, the position information of the reference block (MB2) may be induced, and motion information of the current block may be induced according to the position information of the reference block (MB2). In order to search for a corresponding block referred by the current block, depth information of the corresponding depth block may be utilized. For this operation, information regarding the viewpoint direction of the reference picture referred by the current block may be acquired. As described above, the inter-view position difference may be induced from the depth information of the corresponding depth block using Equation 7, and may also be induced in units of a pixel. A representative inter-view position difference may be induced from the induced inter-view position difference. The representative inter-view position difference may be denoted by a vector and is called a local motion vector. It may be possible to search for the position of the corresponding block using the current block position and the local motion vector, and it may also be possible to code the current block using the motion information of the corresponding block. The local motion vector may be induced while being classified according to individual partitions specified by a current block type. In this case, coding may be performed using a motion skip for each partition of the current block. For example, when acquiring the first flag information from the slice header, if the current slice uses the motion skip, second flag information for the current macroblock may be acquired from the macroblock layer. If the motion skip is used in the current macroblock according to the second flag information, the current macroblock type may be acquired. It may be possible to acquire the local motion vector for the partition dependent upon the current macroblock type. In other words, the local motion vector may be induced using depth information of the corresponding depth picture located at the same position as the above-mentioned partition. If the current macroblock is a 8×8 macroblock, four local motion vectors can be acquired, However, if the corresponding block is encoded using intra-frame prediction, it is impossible to perform the motion skip using the corresponding block. In this case, it is possible to perform the motion skip using a contiguous block of the corresponding block. The contiguous block may include blocks which are located at a left side, an upper end, a left upper end, and a right upper end on the basis of the corresponding block. For example, if the corresponding block is encoded using intra-frame prediction, motion information of the block located at the left side of the corresponding block may be used. If it is impossible to use the above-mentioned left block of the corresponding block, motion information of the block located at the upper end of the corresponding block can be utilized. Alternatively, the central value of motion information of the contiguous block may be utilized, and an average of the motion information of the neighbor block may be utilized.

If the corresponding block is encoded using intra-frame prediction, the intra-frame prediction mode used in the corresponding block is induced, and intra-frame prediction may be performed using pixels contiguous to the current block according to the intra-frame prediction mode.

If the motion skip is utilized using the local motion vector for each partition of the current block, a corresponding block that is encoded using intra-frame prediction may be present in a plurality of corresponding blocks associated with the partition of the current block. In this case, the motion skip may also be performed on the partition of the current block using motion information of the remaining corresponding blocks other than the corresponding block encoded using the intra-frame prediction.

Embodiments of the present invention may be used to perform inter-viewpoint prediction using depth information.

As apparent from the above description, the video signal processing method according to embodiments of the present invention can perform inter-viewpoint prediction using depth information, such that a motion vector of a macroblock can be induced from a decoder using such depth information. Therefore, a motion vector of the macroblock is not separately coded, resulting in reduction of the amount of transmission (Tx) bits. In addition, the video signal processing method uses a flag that indicates whether to perform inter-viewpoint prediction using depth information, such that it can effectively indicate whether inter-viewpoint prediction or prediction between depth viewpoints is performed.

In addition, the video signal processing method according to embodiments of the present invention obtains a position difference between viewpoints in units of a pixel using depth information of a macroblock, and correctly predicts a pixel value of the macroblock on the basis of the pixel, resulting in reduction in residual data.

The video signal processing method according to embodiments of the present invention applies a skip mode using depth information, such that it may derive a motion vector of a skip macroblock from a decoder using the depth information and may not separately encode a macroblock of a skip macroblock. In addition, the video signal processing method uses a flag indicating whether a skip mode is to be applied using depth information, such that it can effectively use a skip mode for the macroblock.

In addition, the video signal processing method according to embodiments of the present invention used in a skip mode based on depth information, which can increase the accuracy of prediction by obtaining a local motion vector in units of a macroblock. When obtaining a motion vector of a macroblock, the video signal processing method can configure a motion vector candidate of the macroblock using depth information, and can obtain an optimum motion vector for the macroblock using the motion vector candidate, thereby more accurately predicting a pixel value of the macroblock.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing a video signal, the method comprising:

receiving a video signal, the video signal including a current color picture and a current depth picture;

acquiring a depth inter-view prediction flag for a current block in the current color picture, the depth inter-view prediction flag indicating whether the current block is coded using depth inter-view prediction, the depth inter-view prediction being used to predict color information of the current block from a reference block in a neighboring view of the current block by using depth information of a corresponding depth block in the current depth picture;

obtaining motion skip flag information corresponding the current color block from the video signal;

acquiring color information of the reference block corresponding to the current block based on the motion skip flag information when the current block is coded using the depth inter-view prediction according to the depth inter-view prediction flag; and predicting the color information of the current block using the color information of the reference block, wherein, based on the motion skip flag information indicating that the current color block is using motion skip, acquiring the color information of the reference block comprises:

obtaining a depth skip indication flag from the video signal, the depth skip indication flag indicating whether the current block is coded in a depth skip mode;

acquiring the depth information of the corresponding depth block for the current block based on the depth skip indication flag;

deriving disparity vectors for pixels of the current block based on a value resulting from dividing a product of a focal length of a current viewpoint camera and a distance between the current viewpoint camera and a reference viewpoint camera by the depth information of the corresponding depth block;

deriving a representative disparity vector for the current block from an average value of the derived disparity vectors; and determining the reference block corresponding to the current block based on the derived representative disparity vector, wherein the depth information indicates a disparity difference between the current viewpoint camera and the reference viewpoint camera, wherein, based on the motion skip flag information indicating that the current color block is not using motion skip, acquiring the color information of the reference block comprises:

obtaining a global motion vector based on inter-view reference information;

obtaining additional information including offset information and viewpoint direction information;

obtaining a corrected global motion vector based on the global motion vector and the offset information; and acquiring the color information of the reference block based on the corrected global motion vector and the viewpoint direction information.

2. The method according to claim 1, wherein the disparity vector is derived in units of a pixel of the corresponding depth block.

3. The method according to claim 1, wherein the corresponding depth block is a block of the current depth picture located at a same position as the current block.

4. The method according to claim 1, wherein the disparity vector represents a disparity between a pixel position of the current block and a pixel position of the reference block.

* * * * *